United States Patent Office 2,765,039
Patented Oct. 2, 1956

2,765,039

ACIDIZING WELLS

Donald C. Bond, Crystal Lake, and Roy H. Lorenz, Elmhurst, Ill., assignors to The Pure Oil Company, Chicago, Ill., a corporation of Ohio No Drawing. Application December 24, 1951,
Serial No. 263,128

8 Claims. (Cl. 166—42)

The present invention is directed to a method of increasing the permeability of earth formations to the flow of fluids therethrough by chemical treatment. More particularly, the invention appertains to a method of preventing the precipitation of certain oil and water insoluble salts which may be the direct or indirect result of the treatment of an earth formation with an acidizing solution containing a fluophosphoric acid.

Acidization of earth formations, particularly siliceous earth formations, has been practiced for some time for the purpose of increasing the permeability or flow of fluids therethrough. In certain instances, the problem of avoiding the formation of hydrous and gelatinous reaction products, which tend to clog the interstices and decrease the permeability attained thereby obviating the effectiveness of the acidization, has arisen. These hydrous and gelatinous or otherwise inhibitory precipitates may result from the presence of certain alkali metal and alkali earth metal compounds present either in the connate water naturally occurring in the formation to be treated or present in the formation itself.

This invention is based on the discovery of a method of acidizing earth formations in an environment wherein there is the likelihood of precipitation of alkali metal and alkali earth metal salts, particularly sodium and calcium salts. The method comprises one or more steps in conjunction with the acidization wherein a diluting medium is used to sweep out the connate waters and a particular spent acid medium is employed to prevent the precipitation of the calcium or like salts.

It, therefore, becomes a principal object of this invention to provide a method for preventing the precipitation of alkali metal salts and alkali earth metal salts during the acid treatment of earth formations in environments containing precipitable amounts of these salts.

Another object of this invention is to provide a method for preventing the precipitation of alkali metal and/or alkali earth metal salts or their complexes during the treatment of earth formations, particularly siliceous earth formations, with acid solutions containing a fluophosphoric acid.

An object of this invention is to provide a method of preventing the clogging of the interstices of siliceous earth formations, during treatment with acid solutions containing a fluophosphoric acid, due to the presence of precipitable amounts of sodium and calcium in the connate waters or precipitable amounts of calcium present in the formation itself.

It has been found that sodium fluosilicate and calcium fluoride precipitates will form, under the conditions present during the hydrofluoric acid treatment of siliceous formations for the purpose of increasing the permeability thereof, in sufficient amounts to clog the interstices and decrease the effect of such acidization. Therefore, a further object of this invention is to prevent the precipitation of sodium fluosilicate and calcium fluoride during the treatment of a siliceous earth formation with a fluophosphoric acid-containing treating reagent.

Other objects and advantages of this invention will become apparent as the description thereof proceeds.

The prior art has suggested methods for overcoming the problem of clogging of earth formations in connection with processes for increasing the permeability. The passage of oil or other non-aqueous fluid through a formation containing connate water, as described in copending application, Serial No. 178,958, filed August 11, 1950, entitled "Acidizing Wells," now abandoned, is not always successful in preventing the type of precipitation contemplated by the present invention for the reason that the non-aqueous medium reduces the water content to an "irreducible minimum" which may be about 10 per cent to 50 per cent of the pore space of the formation. Consequently, there still remains sufficient connate water to cause the undesired precipitation and clogging. Further, not only are those methods which are designed to prevent calcium salt precipitation sometimes ineffectual in themselves, depending on the environment encountered, but these methods will not prevent the precipitation of sodium salts. Calcium sequestering agents, for example, are not designed to prevent the precipitation of sodium salts and do not, under all conditions, successfully prevent the precipitation of calcium salts.

A first treatment of the formation with hydrogen fluoride followed by a treatment with hydrogen chloride will not always prevent the precipitation of insoluble sodium salts since the formation conditions may not allow proper contact of the hydrogen chloride with the interstices containing any undesirable precipitates. Treatment with fluoboric acid solutions containing excess free boric acid, followed by an aqueous fluoboric acid solution containing a small excess of free hydrofluoric acid, will not prevent the precipitation of sodium salts, especially sodium fluosilicates. Moreover, the effectiveness of this last method in preventing the precipitation of calcium fluoride may be offset in some instances by the inhibitory effect of the boric acid on the reactivity of the acidization agent toward silica. Also, these prior art processes do not take into account the fact that the flushing of certain siliceous formations of the bentonitic variety may lead to swelling of the formation to such an extent that any previous or subsequent acidization is futile.

The general method of acidization to be used in conjunction with the steps of the present invention comprises introducing water to the well bore at a point adjacent the formation to be acidized, then introducing a sufficient amount of a fluophosphoric acid. Typical examples of such fluophosphoric acids, so-called FP acids, are monofluophosphoric acid, difluophosphoric acid, and hexafluophosphoric acid. The technique employed in using fluophosphoric acids as acidizing reagents for siliceous formations is more fully described in U. S. Patent 2,664,-398. The concentration of these fluophosphoric acids in aqueous solution, formed at the formation interface and subsequently forced therein by hydrostatic pressure, may vary between about 10 per cent to 80 per cent by weight of acid to diluent. It is preferred, because of the speed and efficiency of its reaction with typical siliceous formations, to use a solution containing about 50 per cent of the fluophosphoric acid in water.

Using difluophosphoric acid as an example, since this acid has proved to be the most efficient, the hydrolysis reaction setting free the active fluoride and hydrogen ions may be depicted as follows:

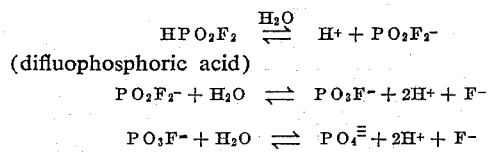

$$HPO_2F_2 \underset{}{\overset{H_2O}{\rightleftharpoons}} H^+ + PO_2F_2^-$$

(difluophosphoric acid)

$$PO_2F_2^- + H_2O \rightleftharpoons PO_3F^= + 2H^+ + F^-$$

$$PO_3F^= + H_2O \rightleftharpoons PO_4^{\equiv} + 2H^+ + F^-$$

Considerable heat is evolved from the above hydrolysis reaction, which heat aids in the dissolving of the siliceous formation and also serves to increase the solubility of the reaction products. This heat may be quickly dissipated with the result that the resultant reaction products from the contact of the acid solution with the siliceous formation and the connate water become an environment containing a high potential of precipitable sodium and calcium salts. A principal reaction product is fluosilicic acid and its salts. The presence of fluosilicic acid is responsible for the precipitation of hydrous and gelatinous alkali metal fluosilicates, particularly sodium fluosilicate. The precipitation of sodium fluosilicate is dependent upon the concentration of the available sodium ion in the connate water along with any sodium that may be present in the earth formation. The fluoride ion, either initially present to contact the connate water or present to react with any calcium in the earth formation is responsible for the precipitation of calcium fluoride. The elimination of these two reactions forming insoluble fluosilicates and fluorides constitutes the main object of this invention. This main object is accomplished by one or more steps used in conjunction with the acidization procedure. These auxiliary steps comprise driving out the connate waters from the formation to be treated through the injection of a diluting or flushing medium where the connate waters contain precipitable amounts of sodium and/or calcium followed by the acidization, which acidization is conducted either in the presence of a particular spent acid medium, including spent fluophosphoric acid or spent hydrofluoric acid, or conducted by first introducing the spent acid medium followed by acidization with an acid solution containing a fluophosphoric acid, or conducted by introducing into the formation a mixture of spent fluophosphoric acid or spent hydrofluoric acid and the acidizing medium.

The problem of acidizing a calcium containing siliceous formation where there is no connate water present containing precipitable amounts of sodium and the problem of treating a siliceous formation which may or may not contain calcium but does contain connate water with precipitable amounts of sodium and/or calcium is taken up in a related copending application of the same inventors, entitled "Acidizing Wells," Serial Number 263,127, filed simultaneously herewith, the disclosure of which is hereby incorporated by reference, now U. S. Patent 2,690,428.

In said related copending application, it is shown that the precipitation of calcium salts, particularly calcium fluoride, may be prevented during the acidization of a calcium-containing siliceous formation by conducting the acidization in the presence of fluosilicic acid, the principal acidizing medium being a hydrofluoric acid containing solution and the fluosilicic acid having as its source either fluophosphoric acid that has been spent by reaction with silicon dioxide, or hydrofluoric acid that has been similarly reacted. The source of fluosilicic acid may be either difluophosphoric, monofluophosphoric, or hexafluophosphoric acid which has been spent by reaction with silicon dioxide. The acidization is conducted by either first introducing the fluosilicic acid, from whatever source, followed by the regular acidization treatment or admixing the fluosilicic acid and the acidization liquid followed by introduction of the mixture into the formation being treated. The steps of this copending application are contemplated as augmenting the process of the present invention.

More specifically, in said related copending application, it is shown that, when the relative amount of precipitation of calcium salts is correlated with the molarity of mixtures of fluosilicic acid, a linear relationship is obtained, and where the concentration of calcium is excessive, the use of fluosilicic acid will serve to mitigate the effect of precipitation within the formation interstices in actual practice. Although the use of fluosilicic acid may be assumed to act to tie up the fluoride ion, as evidenced by the fact that it reduces the activity of the acid solution toward silica, the extent of retardation is not as severe as when boric acid is used as a precipitate inhibitor. A typical example may comprise subjecting a Berea sandstone in an oil well to contact with a mixture of 2,500 gallons of 50 per cent difluophosphoric acid solution containing 1,250 gallons of spent difluophosphoric acid. The amount of hydrogen fluoride-containing acidization solution applied to a given earth formation will depend upon the pore volume and extent of the formation. The fluosilicic acid may be introduced in varying quantities depending on the calcium content of the formation and the quantity of acidizing solution employed. As an example, where the quantity of acidizing solution used varies from 500 to 5,000 gallons, the quantity of fluosilicic acid may vary from 100 to 2,500 gallons. Concentrations of acidizing solution containing 5 to 50 percent by weight of hydrogen fluoride may be used and, in the case of fluophosphoric acids, concentrations of 40 to 60 percent by weight are contemplated.

This above described method of treating calcium containing formations is advantageous where the calcium content is not more than 10 to 20 per cent of the formation. Where the calcium content is higher than these limits, other treating reagents, such as hydrochloric acid or hot potassium hydroxide solutions, are preferred as an initial treatment. In this regard, the hydrochloric acid, for example, would be injected ahead of the fluophosphoric acid containing acidization solution for the dissolution of the major portion of soluble calcium carbonate. This procedure will effect a saving of the more expensive fluophosphoric acid for reaction with the silica content of the formation. Also, there will be a lessening of the possibility of the precipitation of insoluble calcium salts. The amount of hydrochloric acid used in this alternative procedure should be somewhat greater than the stoichiometric amount required to react with all of the calcium carbonate in the siliceous formation which will be subsequently treated with the fluophosphoric acid-containing solution.

In order to demonstrate the present invention, a series of experiments were conducted to show that fluosilicic acid will cause the precipitation of sodium fluosilicate from sodium-containing solutions and that the presence of a fluophosphoric acid in an acidizing solution will cause the precipitation of calcium fluoride from calcium-containing solutions.

Fresh 50 per cent difluophosphoric acid solutions were prepared by mixing equal weights of anhydrous difluophosphoric acid and distilled water. Spent 50 per cent aqueous difluophosphoric acid solutions were prepared by agitating a mixture of 50 per cent aqueous difluophosphoric acid with ordinary blasting sand for 24 hours at about 80° F. The spent acid was separated from the undissolved sand by decantation. Fresh sodium chloride, magnesium, and calcium chloride solutions in distilled water were prepared in varying concentrations. And finally mixtures of these solutions were prepared in various proportions and the extent of precipitation in each was noted visually. The results are set forth in Table I.

TABLE I

*Precipitation in mixtures of salt solutions and FP acids*

| No. | Salt Solution | | Ratio: Vol. Salt Solution / Vol. Fresh 50% FP Acid #2 | | | Ratio: Vol. Salt Solution / Vol. Spent 50% FP Acid #2 | | |
|---|---|---|---|---|---|---|---|---|
| | Percent NaCl | Percent CaCl₂ | 1:9 | 1:1 | 9:1 | 1:9 | 1:1 | 9:1 |
| 1 | 0.9 | 0 | | | | no ppt | no ppt | no ppt |
| 2 | 1.8 | 0 | | | | slight ppt | sl. ppt | sl. ppt |
| 3 | 3.5 | 0 | | | | ppt | ppt | ppt |
| 4 | 7.0 | 0 | no ppt | no ppt | no ppt | do | do | ppt |
| 5 | 26.5 (satd.) | 0 | do | do | do | large ppt | lge. ppt | lge. ppt |
| 6 | 0 | 0.03 | slight turbidity | slight turbidity | slight turbidity | | | |
| 7 | 0 | 0.06 | sl. ppt | do | do | | | |
| 8 | 0 | 0.13 | do | sl. ppt | do | | | |
| 9 | 0 | 0.25 | ppt | ppt | ppt | | | |
| 10 | 0 | 0.5 | do | do | do | | | |
| 11 | 0 | 1.0 | do | do | do | | | |
| 12 | 0 | 2.0 | do | do | do | no ppt | no ppt | no ppt |
| 13 | 7 | 2 | do | do | do | ppt | ppt | ppt |
| 14 | 1% | MgCl² | sl. ppt | turbidity | slight turbidity | | | |

FP acid #2 is difluophosphoric and from Table I it is seen that spent difluophosphoric acid containing fluosilicic acid forms precipitates of sodium fluosilicate with sodium chloride solutions containing more than 1 per cent of sodium chloride. However, fresh difluophosphoric acid forms no precipitates with even a saturated sodium chloride solution. On the other hand, the fresh difluophosphoric acid readily forms precipitates with the solutions of calcium chloride, the precipitate involved in the latter being calcium fluoride. In experiment 13, the salt solution contained a mixture of sodium and calcium ions and a precipitate was formed by all proportions of fresh and spent difluophosphoric acid. Experiment 14 shows that magnesium fluoride is every bit as insoluble as sodium fluosilicate. However, the average oil well brine will contain much more sodium than magnesium (10 to 50 times as much) and, as a consequence, the likelihood of precipitation of magnesium fluoride is for all practical purposes eliminated. As has been demonstrated, the fluophosphoric acids theoretically hydrolyze to produce as one product, phosphate ions. However, the possibility of the precipitation of calcium phosphate is likewise forestalled by the presence of the acidic environment.

Concerning experiments of Table I, especially numbers 6-13, it is seen that under the conditions shown the ratio of the salt solutions to the various acid solutions has no effect on the formation of precipitates. It is, therefore, evident that because of the insolubility of the calcium salts the prevention of their precipitation by maintaining in the environment sufficient solvent is for all practical purposes precluded. Experiment 12 shows that spent fluophosphoric acid does not form a precipitate with a calcium-containing solution, indicating that calcium fluosilicate is not insoluble under these conditions. However, mixtures of spent fluophosphoric acid and sodium-containing solutions produced precipitation. Experiment 4 shows that fresh fluophosphoric acid does not form precipitates with sodium-containing solutions.

The tests shown in Table I were conducted using sodium chloride solutions having concentrations of from 0.9 per cent to saturation (26.5 per cent) and calcium chloride solutions of 2 per cent or less. A 7 per cent sodium chloride solution is equivalent to about 70,000 p. p. m. and a 2 per cent calcium chloride solution is equivalent to about 20,000 p. p. m. While these concentrations do not represent the extreme limit of sodium or calcium content which may exist in brinish formation waters, they do represent concentrations which are typical for oil field brines. Higher concentrations will seldom be encountered. For a tabulation of the composition of representative oil field brines, reference may be had to M. Muskat's book entitled "Physical Principles of Oil Production," McGraw-Hill, 1949, page 106.

In order to demonstrate that the sodium fluosilicate precipitates will have a plugging effect upon earth formations, three different sodium chloride solutions were prepared and were mixed with equal proportions of 50 per cent spent fluophosphoric acid. 100 cc. portions of these acid-salt mixtures were filtered through a #42 Whatman filter paper under 80 mm. vacuum. Results are set forth in Table II.

TABLE II

*Plugging effect of Na₂SiF₆ formed on mixing spent 50% FP acid with various NaCl solutions*

| No. | Percent NaCl | Ratio of Salt Solution to 50% Spent FP Acid #2 Solution | Result of Mixing Salt and Acid Solutions | Ratio of: Time to Pass Acid-Salt Mixture / Time to Pass Distilled Water | Remarks |
|---|---|---|---|---|---|
| 15 | 1 | 1:1 | faint cloudiness | 5.1 | Filtrate clear. |
| 16 | 2 | 1:1 | ppt | 2.9 | 2 mm. thick gelatinous filter cake formed—filtrate clear. |
| 17 | 7 | 1:1 | ppt | 8.9 | 10 mm. thick gelatinous filter cake formed—filtrate clear. |

From Table II it is apparent that the precipitates of sodium fluosilicate are of such nature that they will form a plug in the interstices of an earth formation if the precautions of the present invention are not taken. In order to further demonstrate that the presence of sodium salts in the environment of a producing formation may offset any increases in permeability from acidization thereof, a series of tests were conducted using the fluophosphoric acids in the treatment of sandstone cores which were saturated with bromide brine or with Cumberland injection water. Cumberland injection water is a mixture of fresh water and produced brine. The analysis of these formation waters is given in Table III, following.

ly described. To further demonstrate the invention, mixtures were prepared containing various proportions of distilled water, fresh and spent FP acid, and the bromide brine or Cumberland injection water just described in Table III. The measurement of the amount of precipitation in each test was obtained by visual comparison with a set of standards consisting of a series of six different suspensions of bentonite in water. These standard suspensions contained 0.5, 0.2, 0.1, 0.06, 0.02, and 0.005 per cent by weight of bentonite. The measure of precipitation so obtained had the units of "equivalent per cent by weight of bentonite," as shown in Table IV, following.

TABLE III

*Analysis of Cumberland injection and bromide brines*

(parts per million)

| Description | Ca | Mg | Na | Fe | HCO$_3$ | SO$_4$ | Cl | pH | Sp. Gr. at 60° F. | Dissolved Solids |
|---|---|---|---|---|---|---|---|---|---|---|
| "Final Line Water from Cumberland" (Injection Water) | 12,360 | 1,790 | 31,600 | 0.5 | 114 | 469 | 75,483 | 6.41 | 1.098 | 125,550 |
| "Metz 105 #3 Cumberland" (Bromide) | 9,600 | 1,400 | 29,465 | 18.2 | 86 | 242 | 70,295 | 5.11 | 1.086 | 113,688 |

The experiments of Table IV, under the conditions imposed, may be subjected to the following interpretation. In tests 18 to 24, wherein sufficient fluosilicic acid was present to prevent the precipitation of calcium salts, as in the form of calcium fluoride, the addition of between 40 and 50 cc. of water adequately prevented the formation of insoluble sodium salts, as sodium fluosilicate. Calcium fluosilicate is more soluble than sodium fluosilicate, so that precipitation of the former presents no problem. In tests 25 to 31, where the proportion of difluophosphoric acid has been lowered and a proportionate amount of fresh difluophosphoric acid added, there was still sufficient fluosilicic acid to prevent the precipitation of calcium salts and an equivalent amount of dilution, as 48 cc. of water, prevented the precipitation of sodium salts. However, in tests 32 to 35 where equal ratios of spent to fresh difluophosphoric acid are present, there was apparently an insufficient amount of fluosilicic acid present to prevent calcium salts from precipitating for even after dilution was made to an extent equivalent to tests 18 to 24 and 25 to 31, there still remained a precipitate in the mixtures. This is shown by test 34. And, in the balance of the tests, where the proportion of fresh difluophosphoric acid is higher than the spent difluophosphoric acid, there was insufficient fluosilicic acid to prevent calcium salt precipitation, with the result that dilution with as much as 100 cc. water failed to reduce the amount of precipitation to extinction.

As a corollary of this, it is seen that water dilution will take care of the sodium salt precipitation and, as long as there is sufficient fluosilicic acid present, the calcium salt precipitation is likewise eliminated, but with insufficient fluosilicic acid beng present to prevent the precipitation of calcium salts, the addition of more solvent, for all practical purposes, forfeits the desired result. This serves to confirm the conclusions drawn from Table I, supra.

The fresh and spent FP acids used in the following experiments were prepared in the same manner as previous-

TABLE IV

*Precipitation in mixtures of natural brines and fresh and spent aqueous 50% FP acid #2*

| No. | cc. Bromide Brine | cc. Fresh 50% FP Acid #2 | cc. Spent 50% FP Acid #2 | cc. H$_2$O Added | cc. H$_2$O Added per cc. of Bromide brine-FP Acid Mixture | Turbidity in equivalent per cent Bentonite |
|---|---|---|---|---|---|---|
| 18 | 3 | 0 | 3 | 0 | 0 | 0.3 |
| 19 | 3 | 0 | 3 | 3 | 0.5 | 0.06 |
| 20 | 3 | 0 | 3 | 10 | 1.7 | 0.04 |
| 21 | 3 | 0 | 3 | 20 | 3.3 | 0.02 |
| 22 | 3 | 0 | 3 | 30 | 5 | 0.01 |
| 23 | 3 | 0 | 3 | 40 | 7 | 0.005 |
| 24 | 3 | 0 | 3 | 50 | 8.3 | 0.0 |
| 25 | 3 | 0.75 | 2.25 | 0 | 0 | 0.2 |
| 26 | 3 | 0.75 | 2.25 | 6 | 1 | 0.08 |
| 27 | 3 | 0.75 | 2.25 | 12 | 2 | 0.06 |
| 28 | 3 | 0.75 | 2.25 | 18 | 3 | 0.03 |
| 29 | 3 | 0.75 | 2.25 | 24 | 4 | 0.02 |
| 30 | 3 | 0.75 | 2.25 | 42 | 7 | 0.005 |
| 31 | 3 | 0.75 | 2.25 | 48 | 8 | 0.0 |
| 32 | 3 | 1.5 | 1.5 | 0 | 0 | 0.15 |
| 33 | 3 | 1.5 | 1.5 | 12 | 2 | 0.08 |
| 34 | 3 | 1.5 | 1.5 | 48 | 8 | 0.008 |
| 35 | 3 | 1.5 | 1.5 | 120 | 20 | 0.002 |
| 36 | 3 | 2.25 | 0.75 | 0 | 0 | 0.2 |
| 37 | 3 | 2.25 | 0.75 | 36 | 6 | 0.02 |
| 38 | 3 | 2.25 | 0.75 | 84 | 14 | 0.005 |
| 39 | 3 | 3 | 0 | 0 | 0 | 0.06 |
| 40 | 3 | 3 | 0 | 20 | 3.3 | 0.03 |
| 41 | 3 | 3 | 0 | 100 | 16.7 | 0.01 |

| No. | cc. Cumberland Injection Water | cc. Fresh 50% FP Acid #2 | cc. Spent 50% FP Acid #2 | cc. H$_2$O Added | cc. H$_2$O Added per cc. of Cumbd. Water-FP Acid Mixture | Turbidity in equivalent per cent Bentonite |
|---|---|---|---|---|---|---|
| 42 | 3 | 0 | 3 | 0 | 0 | 0.3 |
| 43 | 3 | 0 | 3 | 2 | 0.3 | 0.2 |
| 44 | 3 | 0 | 3 | 60 | 10 | 0.0 |
| 45 | 3 | 0.75 | 2.25 | 0 | 0 | 0.3 |
| 46 | 3 | 0.75 | 2.25 | 60 | 10 | 0.0 |
| 47 | 3 | 1.5 | 1.5 | 0 | 0 | 0.3 |
| 48 | 3 | 1.5 | 1.5 | 60 | 10 | 0.01 |
| 49 | 3 | 2.25 | 0.75 | 0 | 0 | 0.3 |
| 50 | 3 | 2.25 | 0.75 | 40 | 7 | 0.01 |
| 51 | 3 | 3 | 0 | 0 | 0 | 0.1 |
| 52 | 3 | 3 | 0 | 40 | 7 | 0.015 |

In carrying out the present invention, consideration is first given to elimination of the possibility of precipitation of insoluble alkali metal salts as represented by sodium fluosilicate and also consideration is given to the possibility of the formation of insoluble alkali earth metal salts, calcium fluoride being representative. To accomplish the first objective, it has been demonstrated that dilution with an aqueous medium will adequately dissolve the alkali metal salts. Transposing this to actual practice, and considering that the main source of alkali metal salts is the connate water in the formation, the most practical procedure is to flush out, displace, and at the same time dilute the connate waters within the siliceous formation to be treated, prior to acidization with the fluophosphoric acid-containing solution. Any liquid which will not adversely affect the formation may be used for this purpose, provided in the case of bentonitic formations tending to swell the liquid is capable of carrying an electrolyte into the interstices to forestall such swelling. Water satisfactorily satisfies this requirement.

As the electrolyte, which may be present in an amount from 1 to 5 per cent by weight, any electrolytic ion may be used which prevents swelling. The preferred electrolytic solution is dilute hydrochloric acid having a pH of about 1 to 3. Other electrolytic ions, preferably introduced in the form of an acid, or a readily soluble salt, as the ammonium salt, may include acetate, bromide, iodide, butyrate, isobutyrate, propionate and the like. Caution should be exercised not to introduce an electrolytic ion which will form insoluble complexes or hydrous and gelatinous precipitates with the connate water, thus defeating the purpose of the treatment. The above-described liquids which are suitable for carrying out the preliminary objective of the instant invention will hereinafter be referred to in the specification and claims appended thereto as "aqueous flushing medium."

The flushing step is conducted with a sufficient quantity of an aqueous flushing medium to displace the connate water. This amount will vary according to the pore volume of the formation. By introducing one pore volume of aqueous flushing medium into the formation, as much as 80 per cent of the connate water can be removed. However, using a volume of aqueous flushing medium equivalent to only 68 per cent of the total pore volume of the formation may remove as much as 90 per cent of the connate water. Consideration may also be given to the extent of connate water saturation of the pore space of the formation. The connate water saturation may vary from 35 per cent to 90 per cent. Where connate water saturation is high, more flushing will be necessary. In general, the use of about 5 to 10 pore volumes of water will accomplish the desired results, although as little as one pore volume may be sufficient. The probability of plugging due to precipitation of insoluble alkali metal and alkali earth metal salts is dependent upon the amount and concentration of connate water, the formation porosity, and permeability. No correlation exists between the degree of turbidity in terms of an equivalent bentonite suspension, as reported in the tables, and the degree of plugging or lack of plugging which may be attained.

Since the invention contemplates the treatment of formations containing brinish formation or connate waters in addition to formations which in themselves contain precipitable amounts of alkali earth metal salts, particularly calcium salts, the combination of steps of the invention will include the following:

1. Acidization of a siliceous formation containing connate waters by employing the flushing step as described.

2. Acidization of a siliceous formation containing precipitable amounts of alkali earth metal salts as a constituent of the formation and also containing connate waters wherein the flushing step is followed by acidization in the presence of a spent hydrofluoric acid or spent fluophosphoric acid solution to prevent the precipitation of insoluble calcium salts.

3. Treatment of formations containing appreciable amounts of alkali earth metal salts, as calcium carbonate, employing a first treatment with hydrochloric acid, followed by treatment in accordance with (1) or (2) above.

In treating a siliceous formation containing brinish formation water, an illustrative procedure which may be employed would comprise initially forcing into the formation 10,000 gallons of fresh water. This step may be altered to include one or more of the above described electrolytes in the proper concentration to mitigate swelling of a bentonitic formation. This is followed by 5,000 gallons of 50 per cent difluophosphoric acid solution. After sufficient time has elapsed to complete the reaction of the acid with the formation, the effluent therefrom may be thoroughly flushed from the formation. Where the formation contains calcium salts as a part of its composition the acid treatment is conducted by introducing 5,000 gallons of a solution comprising 3,750 gallons of 50 per cent difluophosphoric acid solution and 1,250 gallons of spent 50 per cent fluophosphoric acid solution. The fresh acid and spent acid solutions may be introduced as a mixture or introduced separately. When the use of a mixture is contemplated, the amount of water present in the spent acid portion should be taken into consideration in order that the acid strength of the mixture remains at about 50 per cent. As a result of this procedure, the production rate of the well is increased from 15 B./D. to 45 B./D.

The amounts of the various treating agents described herein will depend upon such factors as the pore volume of the formation, the composition of the treating solution, and the formation temperature. The usual manipulative procedures are employed to force the solutions into the formation, as a pressure head of mineral oil. The spent acid used containing fluosilicic acid may result from the previous acidization of another formation in the same or different well bore. In certain instances, it may be advantageous to employ the flushing step, as herein described, subsequent to the acidization step, as where the acidizing agent has by-passed a body of connate water in the formation and it becomes necessary to guard against the possible intermingling of this connate water with the acidization products.

The present process, therefore, offers a means for preventing or mitigating the precipitation of oil and/or water insoluble sodium or calcium salts when treating siliceous formations, containing connate waters having precipitable amounts of these salts, with a fluophosphoric acid-containing solution by conducting the treatment with an initial flushing step and acidizing with or without the presence of fluosilicic acid. The calcium salt precipitation inhibitor may be introduced into the siliceous formation followed by the acidization solution or a mixture of the precipitation inhibitor and acidization solution may be used.

Although specific embodiments have been used to demonstrate the invention, they are not to be construed as limiting, the only limitations on the scope of the invention being in the appended claims. Throughout the specification and claims, the term "brine-containing" or "connate water-containing" is intended to mean conditions wherein sodium and/or calcium salts are present within the formation fluids, and by the term "calcium-containing" is meant conditions wherein calcium salts are present as a part of the formation itself and/or are present in the brinish formation waters contained in the interstices of the siliceous formation.

What is claimed is:

1. In the acid treatment of a siliceous geological formation with an aqueous acid solution containing a fluophosphoric acid for the purpose of increasing the permeability of said formation wherein the said formation contains alkali metal constituents which effect the precipitation of insoluble alkali metal salts produced by the interaction of said acid solution with said alkali metal constituents to cause undesirable plugging of said formation, an improvement in mitigating said plugging which comprises the step of forcing into said formation, prior to said acid treatment, an aqueous flushing medium consisting essentially of water in an amount sufficient to maintain said alkali metal salts, thus formed in solution and thereafter forcing into said formation an aqueous solution of a fluophosphoric acid in an amount sufficient to increase the permeability of said formation.

2. The method in accordance with claim 1 in which said alkali metal salts include sodium fluosilicate, said flushing medium is water, and said acid solution is selected from the group consisting of difluophosphoric acid, monofluophosphoric acid, hexafluophosphoric acid and mixtures thereof.

3. A method in accordance with claim 1 in which said aqueous flushing medium contains small amounts not in excess of 5% of electrolyte to mitigate the swelling of any bentonitic constituents of said geological formation.

4. The method in accordance with claim 3 in which the aqueous flushing medium contains a sufficient amount of hydrochloric acid to prevent the swelling of any bentonitic constituents of said geological formation.

5. In the acid treatment of siliceous earth formations with a fluophosphoric acid-containing solution to increase the permeability thereof, said formations containing brine solutions and precipitable amounts of calcium salts, the method of preventing the precipitation of undesirable insoluble sodium and calcium salts produced as a result of said acid treatment which comprises the steps of initially forcing into said formation an aqueous flushing medium consisting essentially of water in an amount sufficient to maintain the sodium salts thus formed substantially in solution and subsequently conducting said acid treatment, wherein said acid treatment results in the formation of fluosilicic acid, in the presence of added amounts of fluosilicic acid, said fluosilicic acid being present in an amount sufficient to prevent substantially the precipitation of said calcium salts.

6. The method in accordance with claim 5 in which the aqueous flushing medium is water.

7. The method in accordance with claim 5 in which the aqueous flushing medium is a water solution containing from 1 to 5 per cent by weight of an electrolyte.

8. The method in accordance with claim 7 in which the electrolyte is hydrochloric acid.

References Cited in the file of this patent

UNITED STATES PATENTS

| | | |
|---|---|---|
| 1,990,969 | Wilson | Feb. 12, 1935 |
| 2,200,710 | Bent et al. | May 14, 1940 |
| 2,225,695 | Henderson et al. | Dec. 24, 1940 |
| 2,300,393 | Ayers | Nov. 3, 1942 |
| 2,367,350 | Heigl | Jan. 16, 1945 |

OTHER REFERENCES

Acidizing Handbook, Kingston, © 1936, page 34.